United States Patent
Bison et al.

(10) Patent No.: US 9,297,493 B2
(45) Date of Patent: Mar. 29, 2016

(54) LAUNDRY DRYER WITH FIRE-RESISTANT SHIELDING

(71) Applicant: Electrolux Appliances Aktiebolag, Stockholm (SE)

(72) Inventors: Alberto Bison, Pordenone (IT); Luciano Sartor, Conegliano (IT); Gabriele Londero, Gemona del Friuli (IT); Piercarlo Novelli, San Quirino (IT); Stefano Di Maso, Sacile (IT); Daniele Solerio, Porcia (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 133 days.

(21) Appl. No.: 14/276,620

(22) Filed: May 13, 2014

(65) Prior Publication Data
US 2015/0330553 A1 Nov. 19, 2015

(51) Int. Cl.
*D06F 58/12* (2006.01)
*F16L 59/14* (2006.01)
*D06F 58/06* (2006.01)
*D06F 58/20* (2006.01)

(52) U.S. Cl.
CPC .............. *F16L 59/145* (2013.01); *D06F 58/06* (2013.01); *D06F 58/20* (2013.01)

(58) Field of Classification Search
CPC .......... F26B 11/00; F26B 23/00; F26B 25/00; F26B 25/06; D06F 58/06; D06F 58/12; D06F 58/20
USPC ........ 34/595, 601, 606, 610; 68/5 C, 5 R, 19, 68/20; 8/139, 149, 159
See application file for complete search history.

(56) References Cited

U.S. PATENT DOCUMENTS

| | | | | |
|---|---|---|---|---|
| 4,307,588 | A | 12/1981 | Smith et al. | |
| 4,930,579 | A * | 6/1990 | George | A62C 3/00 169/54 |
| 7,134,221 | B2 * | 11/2006 | Stein | D06F 58/22 34/381 |
| 7,360,323 | B2 * | 4/2008 | Lee | A47B 77/022 34/601 |
| 7,900,372 | B2 * | 3/2011 | Prajescu | D06F 58/04 211/26 |
| 7,987,615 | B2 * | 8/2011 | Han | D06F 58/20 165/119 |
| 8,024,871 | B2 * | 9/2011 | Han | D06F 58/00 34/602 |

(Continued)

FOREIGN PATENT DOCUMENTS

| | | | |
|---|---|---|---|
| DE | 102012014230 A1 | 4/2013 | |
| KR | EP 1386997 A1 * | 2/2004 | ........... A47B 77/022 |

(Continued)

*Primary Examiner* — Stephen M Gravini
(74) *Attorney, Agent, or Firm* — Banner & Witcoff, LTD.

(57) ABSTRACT

A laundry dryer includes a cabinet, a rotatable drum within the cabinet, a plurality of rollers rotatably supporting the rotatable drum, a process air moisture condensing device provided in a casing in a basement of the laundry dryer, and a water pipe operatively connected to at least one component of the condensing device. The laundry dryer comprises at least one fire-protection shield which contains a fire or burning within the cabinet of the laundry dryer. Accordingly to some aspects, the fire-protection shield includes a fire-resistant roller cover which covers a majority of a face of a corresponding roller such that the corresponding roller is shielded from a fire within the cabinet of the laundry dryer. According to other aspects, the fire-protection device includes a fire-resistant pipe covering configured to shield the water pipe from the fire or other burning within the cabinet of the laundry dryer.

22 Claims, 13 Drawing Sheets

(56) References Cited

U.S. PATENT DOCUMENTS

| | | |
|---|---|---|
| 8,225,528 B2 | 7/2012 | Yoon et al. |
| 8,875,547 B2 * | 11/2014 | Suzuki .................. C01B 13/115 68/12.13 |
| 2002/0184786 A1 * | 12/2002 | Miller, II ................ D06F 58/20 34/132 |
| 2003/0044563 A1 * | 3/2003 | Kocinec ................. A41H 27/00 428/63 |
| 2003/0082972 A1 * | 5/2003 | Monfalcone, III ....... C09D 5/18 442/138 |
| 2004/0221479 A1 * | 11/2004 | Lee ........................ D06F 58/04 34/603 |
| 2005/0023008 A1 * | 2/2005 | Kegler .................... D06F 58/20 169/61 |
| 2005/0045228 A1 * | 3/2005 | Labrador ................. E03B 1/02 137/357 |
| 2005/0155394 A1 * | 7/2005 | Brauchle ............... H05K 5/0004 68/3 R |
| 2005/0229650 A1 | 10/2005 | Kim et al. |
| 2009/0025432 A1 | 1/2009 | Kim et al. |
| 2009/0071033 A1 | 3/2009 | Ahn et al. |
| 2009/0211111 A1 | 8/2009 | Kim et al. |
| 2010/0095548 A1 | 4/2010 | Kim et al. |
| 2010/0126032 A1 | 5/2010 | Kim et al. |
| 2010/0175898 A1 * | 7/2010 | Steinicke ................. A62C 3/00 169/46 |
| 2010/0192397 A1 | 8/2010 | Kim et al. |
| 2010/0199511 A1 | 8/2010 | Ahn et al. |
| 2012/0151792 A1 | 6/2012 | Jang et al. |
| 2013/0031797 A1 | 2/2013 | Hong et al. |
| 2013/0031798 A1 | 2/2013 | Bae et al. |
| 2013/0056231 A1 | 3/2013 | Chatot et al. |
| 2014/0338213 A1 * | 11/2014 | Stegerwald ............. D06F 58/20 34/130 |

FOREIGN PATENT DOCUMENTS

| | | | |
|---|---|---|---|
| KR | 100595181 B1 * | 7/2006 | ........... A47B 77/022 |
| KR | EP 1921200 A2 * | 5/2008 | ............. D06F 58/20 |

* cited by examiner

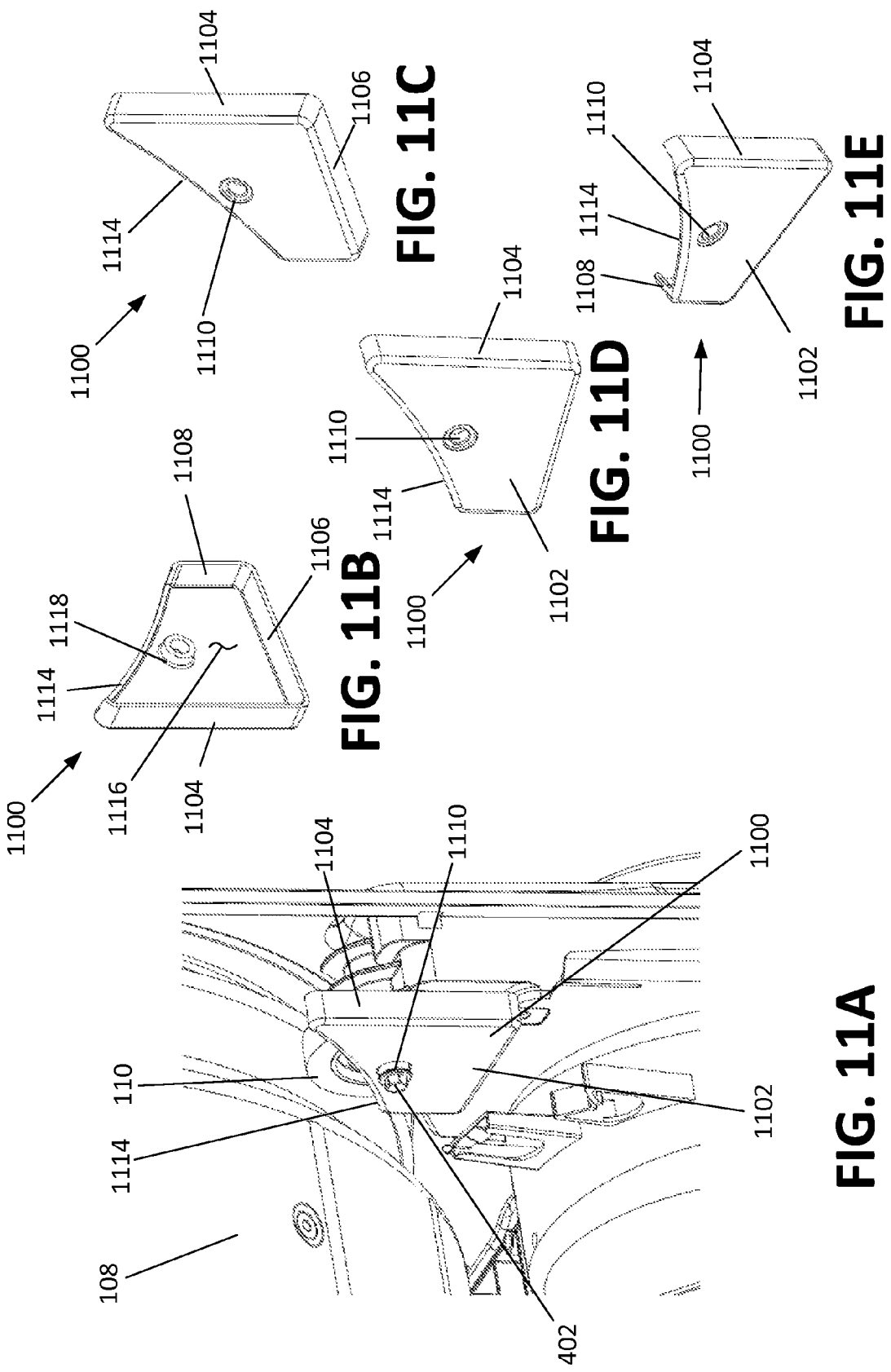

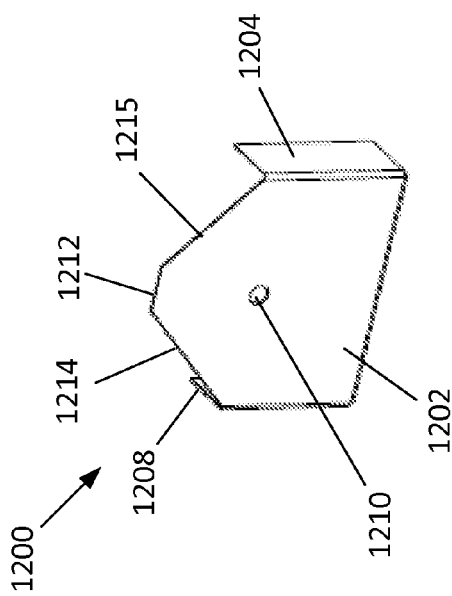
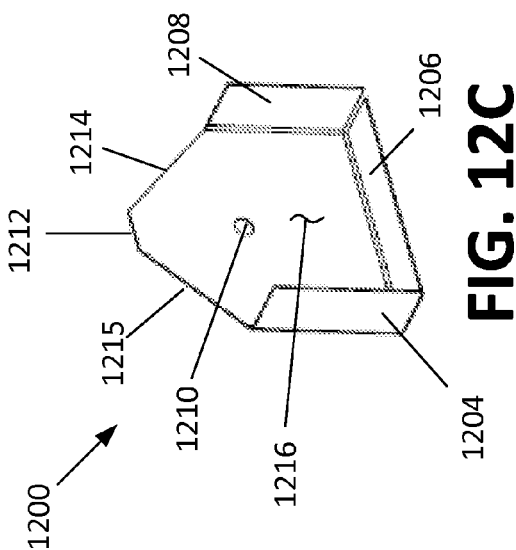
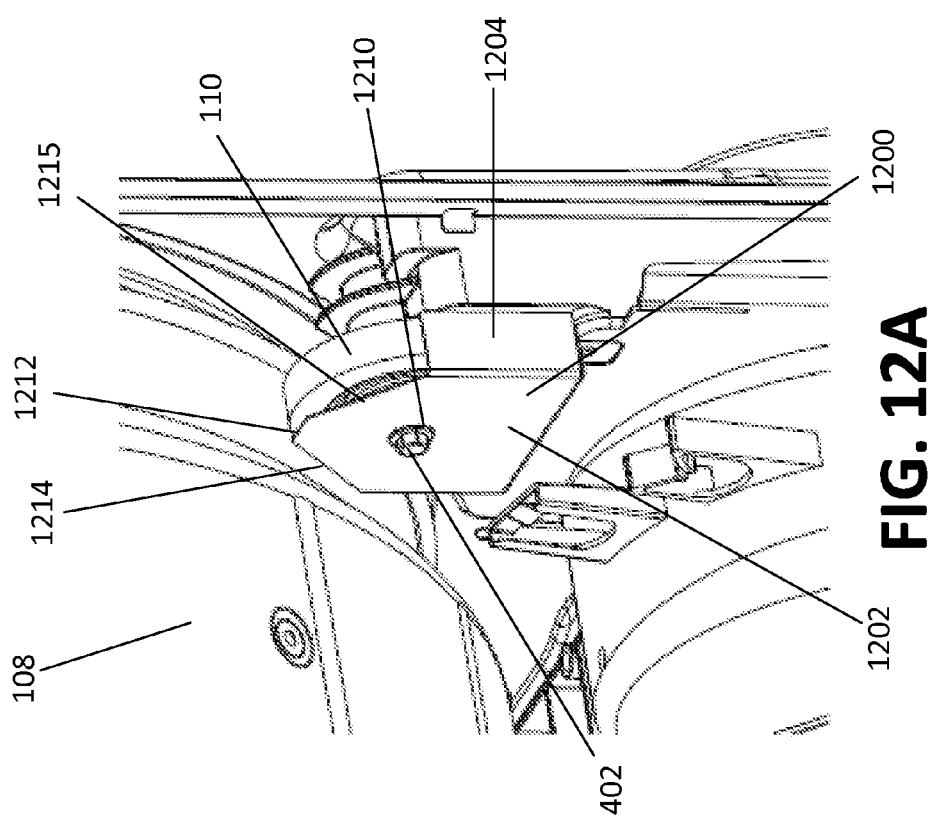
FIG. 12B
FIG. 12C
FIG. 12A

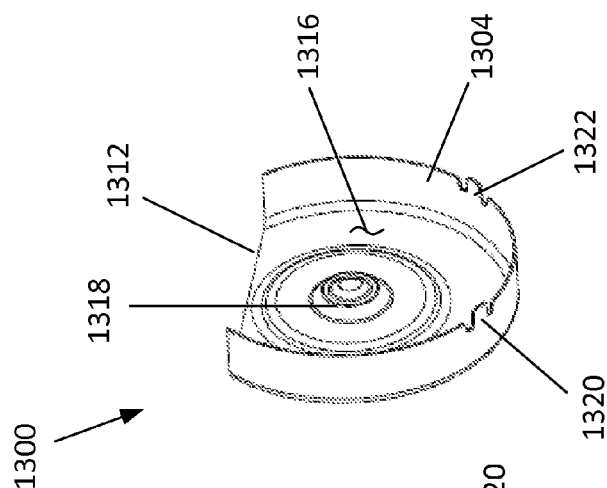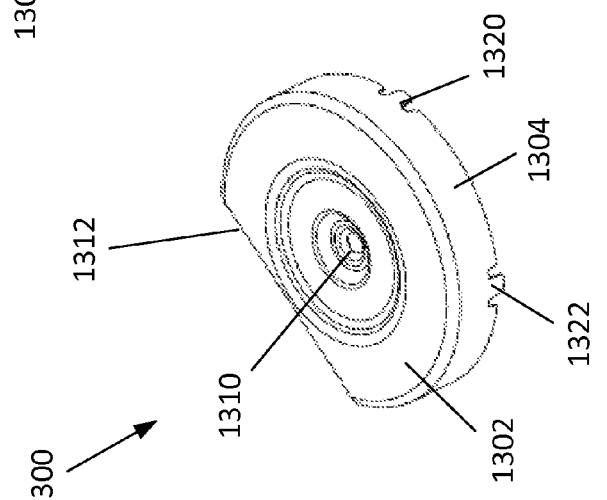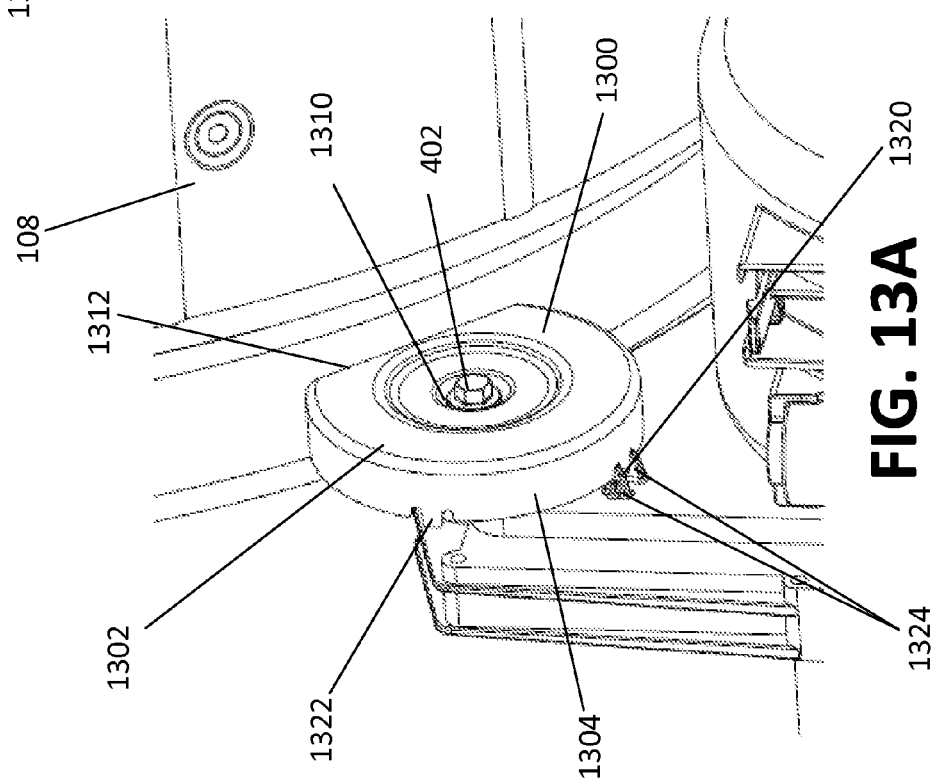

LAUNDRY DRYER WITH FIRE-RESISTANT SHIELDING

TECHNICAL FIELD

The present invention relates generally to laundry dryers. In particular, the invention relates to a laundry dryer that employs fire-resistant shielding.

BACKGROUND

In an effort to reduce as much as possible the chance of a fire or other burning within a conventional laundry dryer due to, e.g., the ignition of lint and/or debris, manufacturers adhere to one or more standards directed to fire suppression and/or concealment within laundry dryers. Such standards are becoming more and more restrictive and thus require appliance manufacturers to design laundry dryers so as to be able to pass the rigorous tests imposed by the standards in order to obtain the necessary safety certifications to sell their products as compliant with the corresponding standard. Thus, when designing and/or manufacturing laundry dryers, manufacturers may include fire suppression and/or concealment systems in order to meet the rigors of one or more safety standards such that their appliance may ultimately be certified by the standard-setting body and thus sold in the corresponding market.

As an example of a mandatory standard in the U.S. market, Underwriters Laboratories ("UL") maintains the UL 2158 standard, which, among other features, tests an electric dryer's ability to suppress and/or conceal an internal fire under both static (e.g., no drum rotating and no air being moved through the dryer's ventilation system) and dynamic (e.g., drum is rotating and air is being moved through the dryer's ventilation system) testing conditions. In order to meet the UL 2158 standard, a dryer must prevent an internal fire from spreading to a sheet draped over the appliance during testing under both conditions. If a dryer passes such a test (i.e., if the fire does not spread to the sheet draped over the dryer), the dryer may be marked and sold with the UL seal of approval.

Accordingly, some dryers include fire-resistant shielding in an effort to combat or control any internal fires which may ultimately result due to, e.g., heated lint and/or debris which has collected within a dryer during continued use of the dryer. For example, U.S. Pat. No. 7,900,372, entitled "Clothes Dryer with Louvre Cover," describes a laundry dryer with louvre cover brackets which allow ambient air to enter a cabinet of the laundry dryer but which help to contain a fire within the cabinet should one ultimately ignite. However, such louvre cover brackets do not shield any internal components of the dryer from the fire within the cabinet, but rather at best seek to contain the fire within the cabinet. Thus, the louvre brackets may be generally ineffective in preventing the fire from propagating throughout the cabinet. Further, a laundry dryer may need to be specially manufactured in order to employ such brackets, and thus these louvre brackets may be generally inapplicable to existing dryers and/or dryer designs.

In another example, U.S. Pat. No. 7,360,323, entitled "Top Firewall Cover Assembly for Laundry Dryer," describes a laundry dryer with a fire plate provided between a top cover and side plates of the laundry dryer. The fire plate helps prevent the spread of a fire taking place in the cabinet to the outside of the cabinet. Again, because the fire plate does not shield any internal components of the laundry dryer, this fire plate may be generally ineffective in preventing the fire from propagating throughout the cabinet. This may be particularly problematic when the fire ignites in the basement of the cabinet, because the fire plate is provided at a top of the laundry dryer, just beneath a top cover.

In yet another example, German Patent Application Publication No. DE102012014230, entitled (as translated) "Laundry Drying Apparatus Having Floor Plate that is Arranged Above Understructure Provided with Non-Flammable Plastic Support Portion so as to Separate Covered Region of Understructure Spatially from Remaining Inner Space," describes a laundry dryer with a floor plate which covers a heat exchanger provided in the basement of the laundry dryer in an attempt to prevent a fire within the laundry dryer from spreading to the plastic heat exchanger. However, the relatively thin floor plate may be prone to deforming or collapsing should the underlying structure (e.g., the basement) deform or melt in the presence of high temperatures caused by a fire or other burning within the laundry dryer. Further, the floor plate fails to cover many internal components of the laundry dryer, such as, e.g., rollers, water pipes, etc., which may ultimately ignite and thus propagate a fire or other burning within the laundry dryer.

Accordingly, there remains a need for further improving fire-resistant shielding for a laundry dryer in a relatively inexpensive way, which is effective in controlling a fire or burning igniting internal components of the laundry dryer, and/or which can be readily used in existing dryer systems and/or dryer designs.

BRIEF SUMMARY OF SELECTED INVENTIVE ASPECTS

According to one aspect of the invention, a laundry dryer includes a cabinet, a rotatable drum provided within the cabinet, a plurality of rollers rotatably supporting the rotatable drum, and one or more shields used to shield an internal component of the laundry dryer from a fire or burning within the cabinet. The one or more shields may include a fire-resistant roller cover which includes an open interior configured to receive a corresponding one of the plurality of rollers and thus cover a majority of a face of the corresponding roller such that the corresponding roller is shielded from a fire or burning within the cabinet of the laundry dryer.

According to another aspect, the laundry dryer may include a process air moisture condensing device provided in a casing in a basement of the laundry dryer, with a water pipe operatively connected to at least one component of the process air moisture condensing device. In such embodiments, the one or more shields may include a fire-resistant pipe covering which is configured to shield at least a portion of the water pipe from fire or other burning within the cabinet of the laundry dryer.

According to still another aspect, in embodiments where the laundry dryer includes the process air moisture condensing device in the casing, the one or more shields may generally be configured to shield at least one internal component other than the basement casing from fire or other burning within the cabinet of the laundry dryer.

BRIEF DESCRIPTION OF THE DRAWINGS

The above and other features, aspects, and advantages of the invention will be fully apparent and understood from the following detailed description, taken together with the appended drawings, wherein:

FIG. 11A is a close-up perspective view of a portion of the internal components of the tumble dryer shown in FIG. 1 including yet another embodiment of a roller cover according an aspect of the invention, and FIGS. 11B-11E are various perspective views of the roller cover depicted in FIG. 11A when not mounted to the corresponding roller.

FIG. 12A is a close-up perspective view of a portion of the internal components of the tumble dryer shown in FIG. 1 including yet another embodiment of a roller cover according an aspect of the invention, and FIGS. 12B and 12C are perspective views of the roller cover depicted in FIG. 12A when not mounted to the corresponding roller.

FIG. 13A is a close-up perspective view of a portion of the internal components of the tumble dryer shown in FIG. 1 including yet another embodiment of a roller cover according an aspect of the invention, and FIGS. 13B and 13C are perspective views of the roller cover depicted in FIG. 13A when not mounted to the corresponding roller.

DETAILED DESCRIPTION OF EXAMPLE EMBODIMENTS

Figure 1:
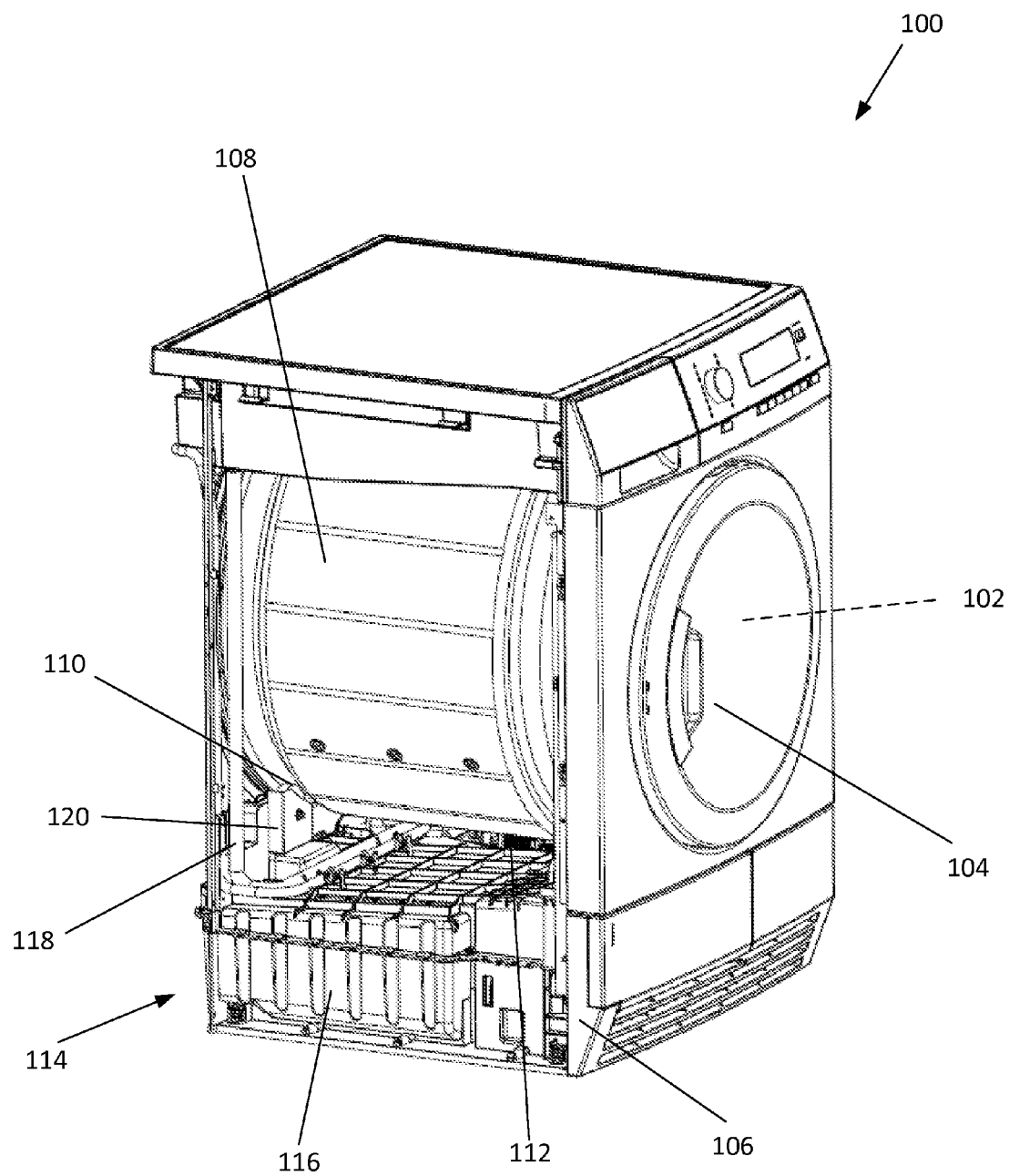
FIG. 1 is a perspective view of a tumble dryer that may employ aspects of the invention with a portion of the cabinet removed to show, in accordance with an aspect of the invention, a generally plastic casing, water pipes, and one of a plurality of roller covers as an example of fire-resistant shielding provided in the dryer.

FIG. 1 depicts a tumble dryer 100 as an example of a laundry dryer which generally includes a drying chamber 102 defined at least in part by an inner circumferential surface of a rotatable drum 108 and located behind access door 104, and a motor 112 (which is more clearly seen in FIG. 2) used to, e.g., rotate the rotatable drum. The tumble dryer 100 further includes rollers 110 located at the axial ends of the rotatable drum 108 which are rotatably fixed to a frame and/or the cabinet 106 of the tumble dryer. An outer surface of the rotatable drum 108 (i.e., a surface opposite to a surface defining the drying chamber 102) rests on the rollers 110 such that the rotatable drum is supported substantially horizontally by the rollers and such that the rotatable drum is configured to rotate about its horizontally-oriented axis when rotated by the motor 112. Each roller 110 can be rotatably mounted on a non-rotatable pivot shaft, or the shaft can rotate together with roller and being rotatably mounted on the cabinet 106 or other support portions. The number of drum supporting rollers 110 is generally chosen according to the weight of the rotatable drum 108, the maximum amount of laundry that the dryer 100 has to dry, the drum-driving transmission, the supporting forces distribution, etc. As is well known in the art, during operation heated air is pulled through the drying chamber 102 by a process air fan or the like and across damp clothing or other articles placed in the drying chamber. Accordingly, moisture is removed from the damp clothing or other articles due to the tumbling of the articles caused by the rotatable drum 108 rotating about its horizontal axis on rollers 110, as well as the heated air moving throughout the drying chamber 102.

Figure 2:
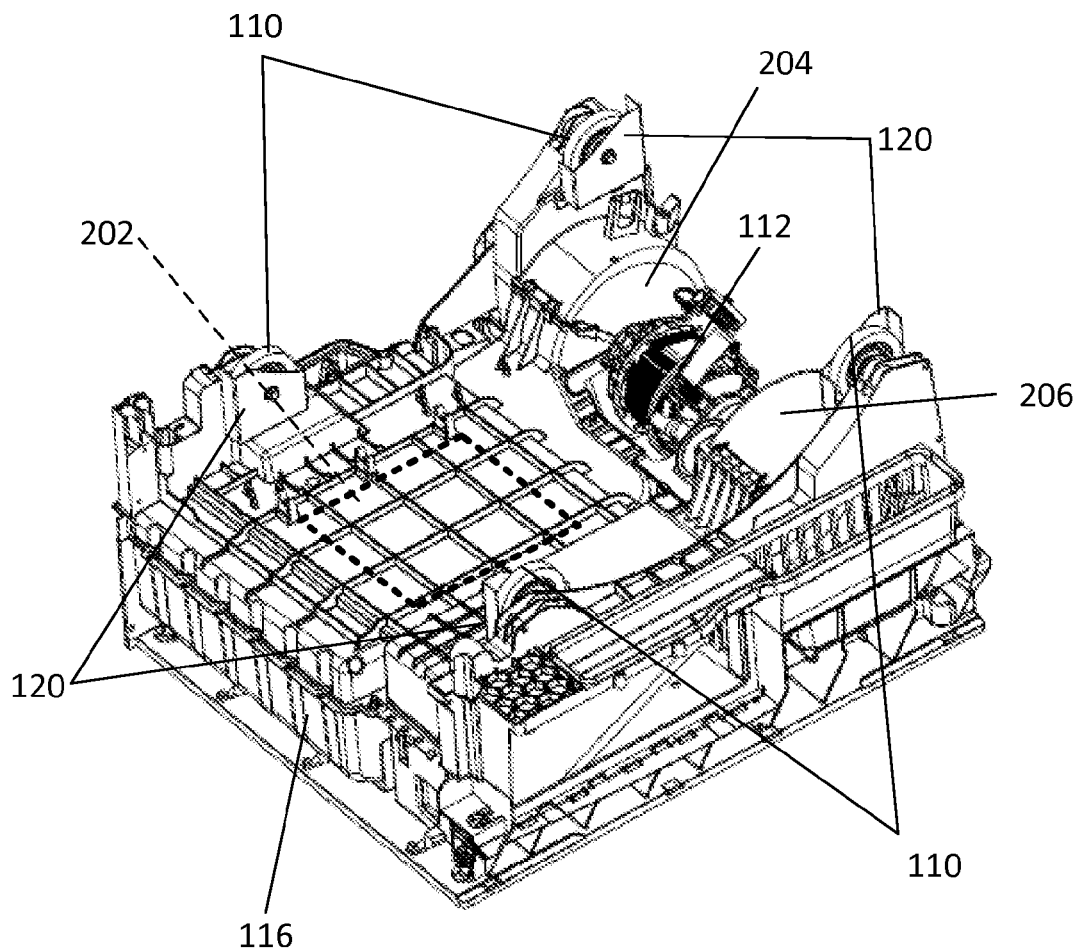
FIG. 2 is a perspective view of some of the internal components provided in a basement of the laundry dryer depicted in FIG. 1 including the location of the plurality of roller covers when each is mounted on a corresponding roller.

The embodiment of the tumble dryer 100 depicted in FIG. 1 is an air-recirculating dryer including a process air moisture condensing device 202 (as schematically depicted in FIG. 2) for removing water from the recirculated process air, i.e. the recirculated drying air. More particularly, in the embodiment depicted in FIG. 1, the entire process air which passes through the drying chamber 102 is cyclically circulated through the tumble dryer 100 without exhausting any significant portion thereof. In such embodiments, a casing 116 may be provided in a basement 114 of the tumble dryer 100 which includes the process air moisture condensing device 202 configured to dehumidify the moisture-laden process air leaving the drying chamber 102. For example, the tumble dryer 100 may include an air-to-air heat exchanger provided in a process air condenser as one suitable example of the process air moisture condensing device 202. Or, the tumble dryer 100 may include a heat pump assembly including a coolant evaporator or the like as another suitable example of a process air moisture condensing device 202. In such embodiments, a refrigerant fluid circulates within the coolant evaporator and evaporates by absorbing heat from the drying air passing through the evaporator. In this way, moisture dispersed in the drying air condenses on the evaporator surface.

For example, in embodiments where the tumble dryer 100 is a condenser-type dryer, a process air condenser including an air-to-air heat exchanger is provided in the casing 116 for removing moisture from the process air which is absorbed as the process air passes over the damp clothing or other articles provided in the drying chamber 102. In such embodiments, the tumble dryer 100 may include a cooling fan 204 or the like provided in the basement 114 of the dryer (in the casing 116 or otherwise) which pumps relatively cool air drawn from an outside of the tumble dryer across the air-to-air heat exchanger of the process air condenser, and then back outside of the cabinet 106. A separate process air fan 206 is provided to pump the moisture-laden process air leaving the dryer chamber 102 across the air-to-air heat exchanger. In such embodiments, heat is thus transferred via the air-to-air heat exchanger from the moisture-laden process air to the relatively cool air drawn from the outside of the tumble dryer. Accordingly, when the process air cools due to this heat transfer, the water contained in the process air condenses and is collected in a condensation collecting tank or the like. The dehumidified air then flows back through a heating element into the drying chamber 102 of the tumble dryer 100 in a closed loop. The process air and the cool air do not mix.

In embodiments where the tumble dryer 100 is a heat-pump dryer, a heat pump assembly may be provided in the casing 116 for removing moisture from the process air which is absorbed as the process air passes over the damp clothing or other articles provided in the drying chamber 102. The tumble dryer 100 in such embodiments includes a closed coolant circuit in addition to the recirculating process air circuit. The process air and coolant circuits are coupled by two coolant-to-air heat exchangers, one being a coolant evaporator and one being a coolant condenser. A coolant compressor allows circulation of the coolant through the coolant-to-air heat exchangers. Heat is absorbed by the coolant as the coolant is evaporated via the coolant evaporator. More particularly, the moisture-laden process air leaving the drying chamber 102 is pumped into the casing 116 by the process air fan where it is cooled and dehumidified by the coolant evaporator. Heat is then released by the coolant when the coolant is condensed in the coolant condenser. That is, the relatively dry process air leaving the first heat exchanger provided at the coolant evaporator absorbs heat from the coolant via a second heat exchanger provided at the coolant condenser, and this relatively low-moisture, warm process air is returned to the drying chamber 102 to further dry the damp clothing or other articles provided therein.

Although not shown, it should be appreciated by those having skill in the art that rather than recirculating the process air through the tumble dryer 100 as discussed in connection with FIG. 1, in some embodiments the entirety of the process air moving through the drying chamber 102 may be exhausted to an outside of the tumble dryer without departing from the scope of this disclosure. In such a configuration, the process air may be heated by a heater provided upstream of the drying chamber 102, as well as by heat recovery due to a slight warming of the air in the cabinet 106 before it is drawn into the heater, by virtue of the heat in the cabinet generated by continued operation of the tumble dryer 100. Or, in still other embodiments, the tumble dryer 100 may be a hybrid-type dryer, and thus exhaust a first portion of the warm, moisture laden process air leaving the drying chamber 102 while recirculating a second portion of the process air. In such embodiments, the second portion of the process air is mixed with fresh air before being reintroduced into the drying chamber 102. For example, commonly owned U.S. patent application Ser. No. 13/437,499, filed on Apr. 2, 2012, and entitled "Dryer With Air Recirculation Subassembly," and Ser. No. 13/912,580, filed on Jun. 7, 2013, and entitled "Laundry Dryer with Accessible Recirculation Air Filter," which are both hereby incorporated by reference in their entirety, each describe a suitable hybrid-type dryer which can incorporate aspects of the invention.

In any of the above configurations, some components of the tumble dryer 100 may be constructed from, e.g., plastics or the like which may be combustible and which thus may ignite and propagate any internal fires or burning within the tumble dryer. Accordingly, some embodiments include one or more fire-resistant shields configured to shield otherwise combustible components of the tumble dryer 100 from a fire or burning within the cabinet 106 of the tumble dryer. For example, the drum-supporting rollers 110 may be made of a suitable low-friction plastic or rubber-like material, such as polyurethane or polyvinyl chloride (PVC) to reduce friction between the rollers and the rotatable drum 108 when the drum is rotated by the motor 112 or the like. However, this plastic or rubber-like material may be likely to burn if a fire or burning starts within the tumble dryer 100.

Accordingly, in some embodiments the tumble dryer 100 may include one or more roller covers 120 surrounding the plastic or rubber-like rollers 110, thus serving as a fire protection barrier should a fire or burning ultimately start within the tumble dryer 100. For example, and as best seen in FIG. 2, in some embodiments each roller 110 in the tumble dryer 100 may include a corresponding roller cover 120. In other embodiments, less than all of the rollers 110 may include a corresponding roller cover 120. In the embodiment depicted in FIG. 2, the tumble dryer 100 includes four rollers 110 configured to rotatably support the rotatable drum 108, with each of the four rollers including a corresponding roller cover 120.

In another embodiment (not shown) the drum can be sustained by a combination of the rollers 110 and a shaft supporting system, placed in the back flange of the drum. In this case, the rollers 110 are placed on an end of the drum which is opposite to the shaft supporting system, and the roller covers 120 may still applied to the rollers at the end of the drum.

Figure 3:
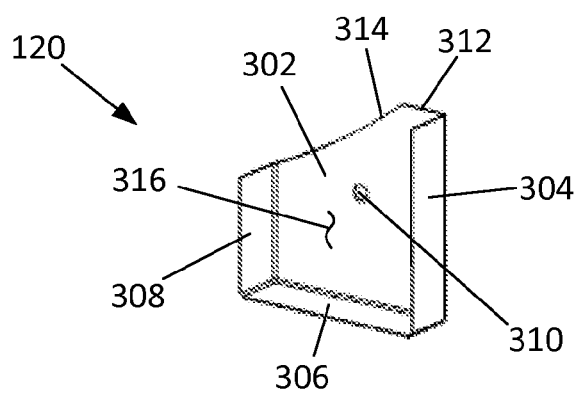
FIG. 3 is a perspective view of one of the plurality of roller covers shown in FIG. 2 when not mounted to the corresponding roller.

As best seen in FIG. 3, each roller cover 120 may comprise a generally elongated and open-faced, box-like structure comprising at a vertical wall 302, a bottom wall 306, and one or more side walls 304, 308. The vertical wall 302, the bottom wall 306, and the side walls 304, 308 generally define an open interior 316 configured to receive the corresponding roller 110. In some embodiments, the roller cover 120 further comprises a 310 hole configured to coaxially align with a corresponding roller 110. In such embodiments, the roller cover 120 may be mounted or otherwise connected to the corresponding roller 110 via a connector 402 (e.g., a bolt or the like) which extends through the hole 310 and is received in, e.g., threads provided in the axle of the corresponding roller and/or roller support. The roller cover 120 may further include one or more spacers (not shown) either integrally provided on the vertical wall 302 or otherwise disposed between the vertical wall and the axle of the corresponding roller 110. The one or more spacers may facilitate unobstructed rotation of the corresponding roller 110 when the roller rotatable supports the rotatable drum 108.

The vertical wall 302 of the roller cover 120 may comprise a flat portion 312 and a slanted portion 314 of an uppermost edge thereof (e.g., an edge of the vertical wall 302 ultimately disposed nearest to the rotatable drum 108). In other embodiments, the flat portion 312 or the slanted portion 314 of the upper edge of the vertical wall 302 may be omitted, such that the slanted portion extends an entire span between the upper edges of the side walls 304, 308 (when the flat portion is omitted) or such that the flat portion extends an entire span between the upper edges of the side walls (when the slanted portion is omitted). In embodiments comprising the slanted portion 314, the slanted portion will ultimately be disposed proximate to an outer surface of the rotatable drum 108 and generally follow the contour of the curved outer surface of the rotatable drum such that the roller cover 120 does not interfere with the rotation of the rotatable drum when the tumble dryer 100 is operated. For example, and as best seen in FIGS. 1-2, the side wall 304 of each roller cover 120 is disposed nearer to a side cover of the tumble dryer 100 than the side wall 308, and, accordingly, the side wall 308 of each roller cover is disposed nearer to a center of the tumble dryer than the side wall 304 of each roller cover. Accordingly, the slanted portion 314 of each roller cover 120 extends inwardly (i.e., away from the side panels of the tumble dryer 100) and downwardly (i.e., towards a floor of the tumble dryer) when mounted on the corresponding roller 110. Accordingly, the plurality of roller covers 120 will collectively form a generally arcuate opening (as best seen in FIG. 2) to receive the rotatable drum 108.

FIGS. 11A-11E depict another suitable embodiment of a roller cover 1100 according to some aspects of the invention. As with the roller cover 120, in this embodiment the roller cover 1100 may comprise a generally elongated and open-faced, box-like structure comprising at a vertical wall 1102, a bottom wall 1106, and one or more side walls 1104, 1108. The vertical wall 1102, the bottom wall 1106, and the side walls 1104, 1108 generally define an open interior 1116 configured to receive the corresponding roller 110. The roller cover 1100 further comprises a hole 1110 configured to coaxially align with a corresponding roller 110, and the roller cover 1100 may be thus be mounted or otherwise connected to the corresponding roller 110 via a connector 402 (e.g., a bolt or the like) as discussed. Further, in this embodiment the roller cover includes an integral spacer 1118. This integral spacer 1118 may facilitate unobstructed rotation of the corresponding roller 110 when the roller rotatable supports the rotatable drum 108. In some embodiments, the roller cover 1100 may be constructed of, e.g., fire-resistant plastic, with the integral spacer 1118 formed integral to the roller cover during a molding process of the roller cover.

Figure 4A:
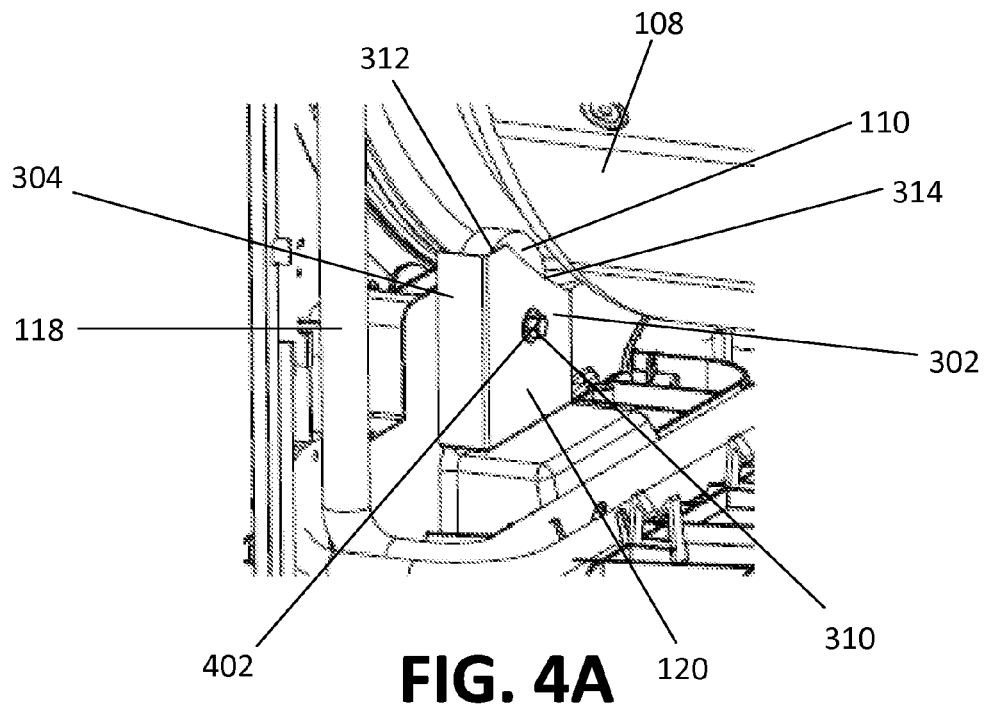
FIGS. 4A and 4B are close-up perspective views of one of the plurality of roller covers as shown in FIGS. 1-3 mounted on the corresponding roller.
Figure 4B:
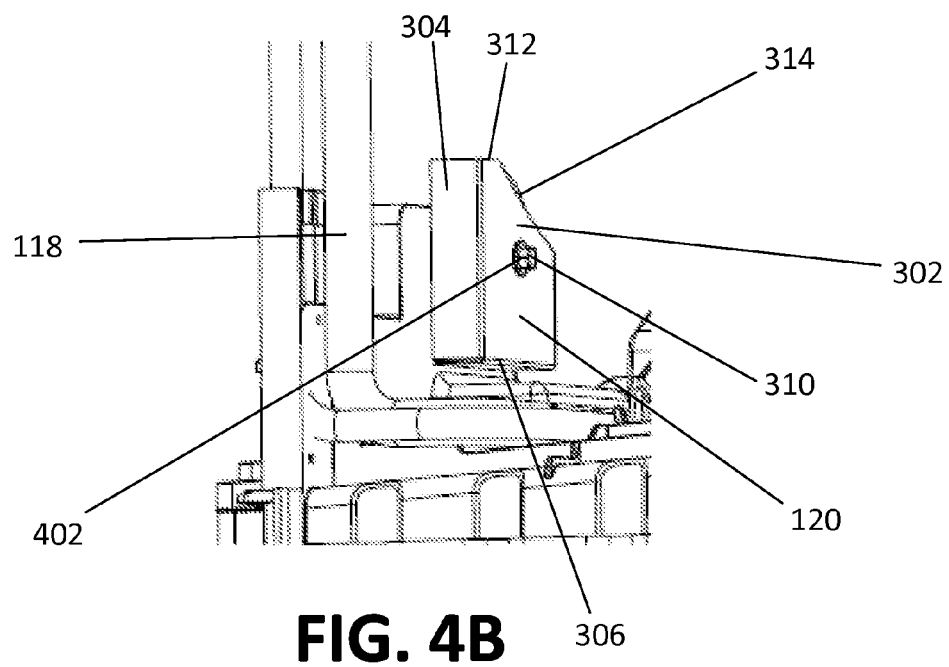

In this embodiment, the vertical wall 1102 of the roller cover 1100 includes a slanted portion 1114 of an uppermost edge thereof (similar to the slanted portion 314 of the roller cover 120 depicted in FIGS. 3-4B). Further, the slanted portion 1114 is concave, such that concavity of the slanted portion 1114 generally follows the contour of the rotatable drum 108. Accordingly, when the slanted portion 1114 is disposed proximate to the curved outer surface of the rotatable drum 108, it more closely aligns with the contour of the rotatable drum than if the slanted portion were not concave. In this regard, the roller cover 1110 does not interfere with the rotation of the rotatable drum 108 when the tumble dryer 100 is operated, and the roller cover effectively shields the corresponding roller 110 from a fire if one ultimately ignites within the cabinet 106.

Figure 14:
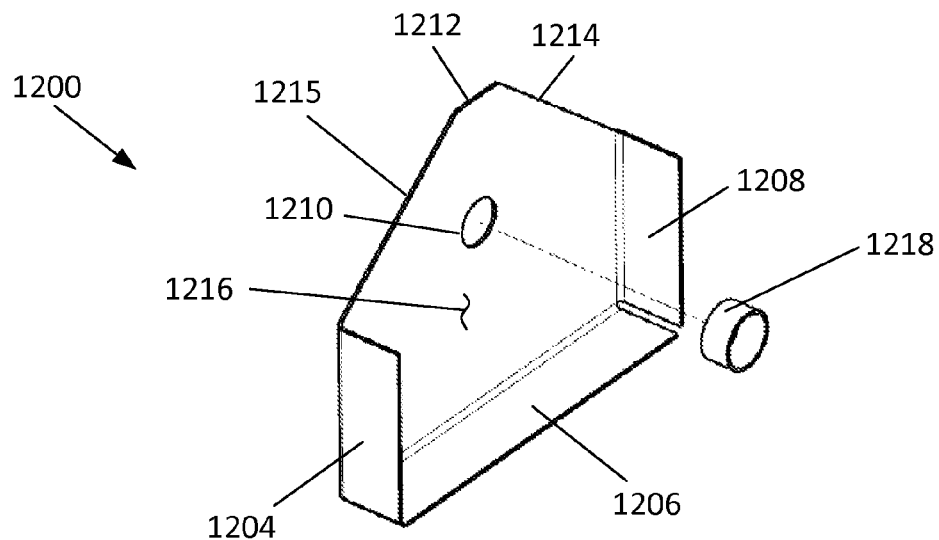
FIG. 14 is a perspective view of the roller cover depicted in FIGS. 12A-12C when not mounted to the corresponding roller and illustrating a spacer to be used with the roller cover.

FIGS. 12A-12C and 14 depict yet another embodiment of a roller cover 1200 according to some aspects of the invention. As with the roller covers 120, 1100, in this embodiment the roller cover 1200 may comprise a generally elongated and open-faced, box-like structure comprising at a vertical wall 1202, a bottom wall 1206, and one or more side walls 1204, 1208. The vertical wall 1202, the bottom wall 1206, and the side walls 1204, 1208 generally define an open interior 1216 configured to receive the corresponding roller 110. The roller cover 1200 further comprises a hole 1210 configured to coaxially align with a corresponding roller 110, and the roller cover 1200 may be thus be mounted or otherwise connected to the corresponding roller 110 via a connector 402 (e.g., a bolt or the like) as discussed. In this embodiment, a spacer 1418 (as seen in FIG. 14) is provided separate from the roller cover 1200 and is coaxially mounted with the corresponding roller 110 and the connector 402. As with the integral roller 1118 included with the roller cover 1100, the spacer 1418 may facilitate unobstructed rotation of the corresponding roller 110 when the roller rotatable supports the rotatable drum 108.

In this embodiment, the vertical wall 1202 of the roller cover 1200 includes a flat portion 1212, a first slanted portion 1214, and a second slanted portion 1215 of an uppermost edge thereof. As with, e.g., the slanted portion 314 of the roller cover 120, when the first slanted portion 1214 or the second slanted portion 1215 (in the embodiment depicted in FIG. 12A, the first slanted portion 1214) is disposed proximate to the curved outer surface of the rotatable drum 108, it generally follows the contour of the rotatable drum such that the roller cover 1200 does not interfere with the rotation of the rotatable drum 108 when the tumble dryer 100 is operated, and such that the roller cover effectively shields the corresponding roller 110 from a fire if one ultimately ignites within the cabinet 106. Because this embodiment of the roller cover 1200 is symmetrical about a vertical centerline (i.e., because the roller cover 1200 includes two slanted portions 1214, 1215 with the flat portion 1212 disposed in the center of the two slanted portions), the roller cover may be conveniently mounted on any roller 110. Specifically, no matter which side of the cabinet 106 or the rotatable drum 108 the roller cover 1200 is mounted, once mounted to the corresponding roller 110, one of the slanted portions (i.e., the first slanted portion 1214 or the second slanted portion 1215) will be disposed proximate to the outer surface. Accordingly, because the roller cover 1200 is symmetrical about its vertical centerline, the roller cover 1200 may be easily mounted to any of the rollers 110 during assembly.

Figure 15:
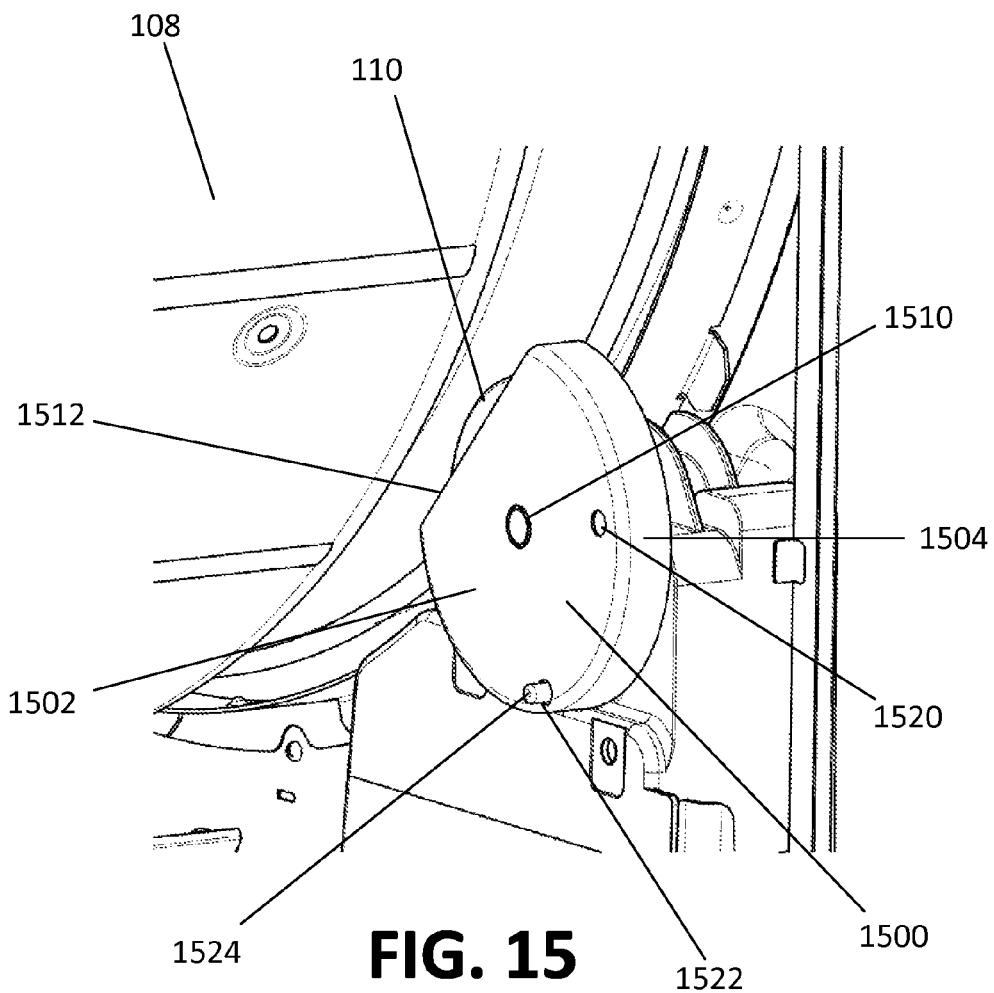
FIG. 15 is a close-up perspective view of a portion of the internal components of the tumble dryer shown in FIG. 1 including yet another embodiment of a roller cover according an aspect of the invention.
Figure 16:
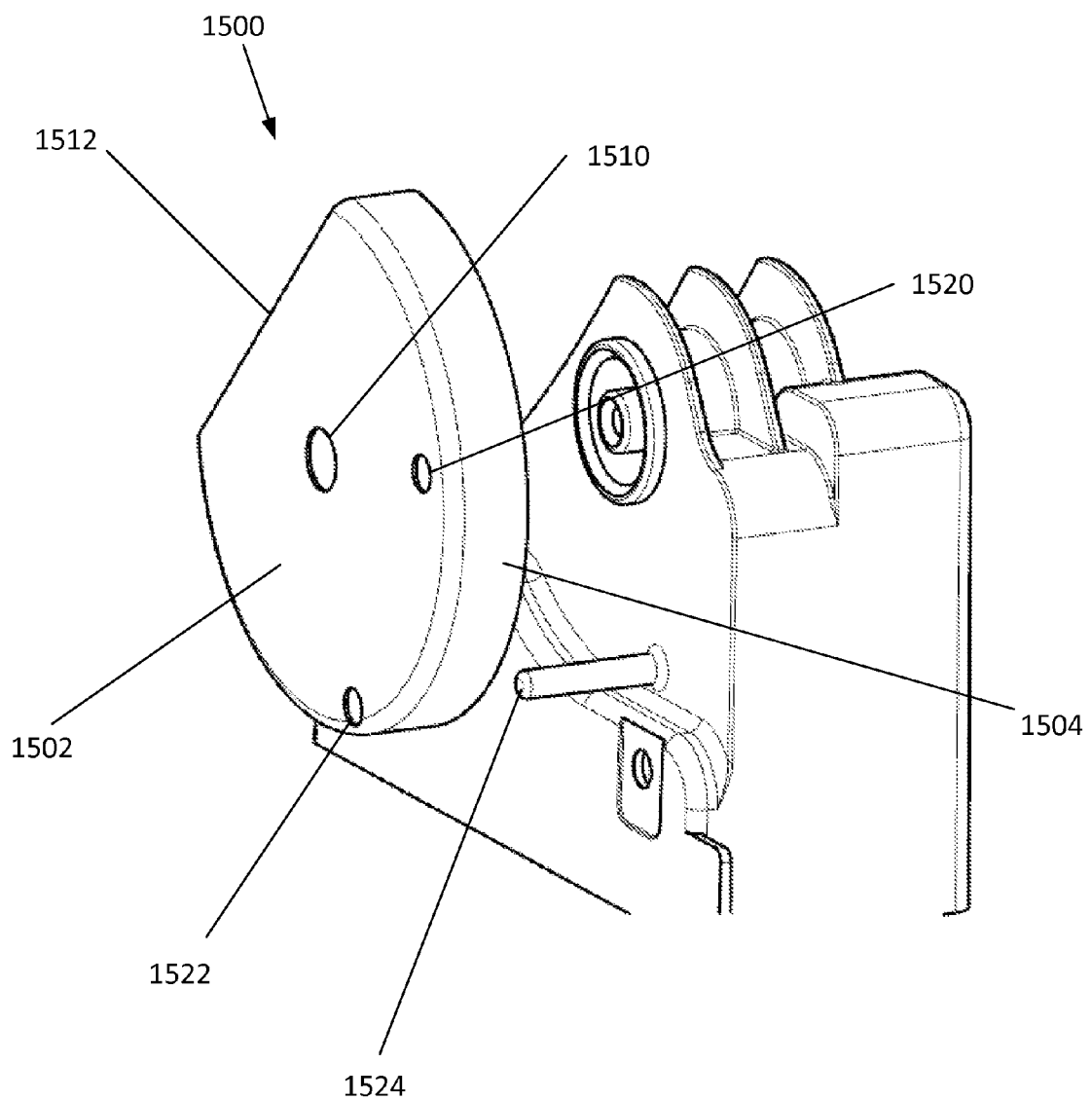
FIG. 16 is a close-up perspective view of a roller cover mounting system used in connection with the roller cover depicted in FIG. 15 with the corresponding roller removed to illustrate the various features thereof.

FIGS. 15 and 16 depict yet another embodiment of a roller cover 1500 according to some aspects of the invention. In this embodiment, a vertical wall 1502 the roller cover 1500 is generally circular in shape and is truncated at a top end (i.e., an end disposed closest to the rotatable drum 108 when mounted in the tumble dryer 100) by a flat portion 1512. The roller cover 1500 includes a circumferential side wall 1504 extending from the rounded edges of the vertical wall 1502, and the vertical wall and the circumferential side wall define an open interior configured to receive a corresponding roller 110 when the roller cover 1500 is mounted in the tumble dryer 100. The roller cover 1500 further comprises a hole 1510 configured to coaxially align with a corresponding roller 110, and the roller cover may be thus be mounted or otherwise connected to the corresponding roller 110 via a connector (e.g., a bolt or the like) as discussed. Although not shown, the roller cover 1500 may further include a spacer (separate from or integral to the roller cover) as discussed in connection with the roller covers 120, 1100, and 1200, which facilitates unobstructed rotation of the corresponding roller 110 when the roller rotatable supports the rotatable drum 108.

The roller cover 1500 further includes a roller cover alignment system configured to align the roller cover when the roller cover is coaxially mounted on a corresponding roller 110. Specifically, and as with roller cover 1200, in this embodiment the roller cover 1500 is symmetrical about a vertical centerline and thus the roller cover may be conveniently mounted on any roller 110. That is, no matter which side of the cabinet 106 or the rotatable drum 108 the roller cover 1500 is mounted, once mounted to the corresponding roller 110, the flat portion 1512 of the vertical wall 1502 will be disposed proximate to the outer surface of the rotatable drum 108. In order to thus properly align the roller cover 1500 when mounted, the roller cover includes a roller cover alignment system including a first positioning hole 1520 and a second positioning hole 1522, each configured to receive a pin 1524 provided in the basement 114 of the tumble dryer 100. For example, when mounted on a first side of the rotatable drum 108 as depicted in FIG. 15, the roller cover 1500 is coaxially mounted with the corresponding roller 110 such that the second positioning hole 1522 receives the pin 1524. In that regard, and as best seen in FIG. 15, the flat portion 1512 of the vertical wall 1502 will be arranged to generally follow the contour of the outer surface of the rotatable drum 108, such that a majority of the corresponding roller 110 will be shielded from a fire if one ultimately ignites within the basement 114 of the tumble dryer 100. Although not shown, when the roller cover 1500 is mounted on a second side of the rotatable drum 108 (i.e., a side of the rotatable drum opposite from that depicted in FIG. 15), the roller cover will be mounted such that the first positioning hole 1520 receives the pin 1524, such that the flat portion 1512 of the vertical wall 1502 slants the opposite way than that depicted in FIG. 15, thus generally following the contour of the outer surface of the rotatable drum 108 on the opposite side of the tumble dryer 100.

FIGS. 13A-13C depict yet another embodiment of a roller cover 1300 according to some aspects of the invention. In this embodiment, and as with roller cover 1500, a vertical wall 1302 the roller cover 1300 is generally circular in shape and is truncated at a top end (i.e., an end disposed closest to the rotatable drum 108 when mounted in the tumble dryer 100) by a flat portion 1312. The roller cover 1300 includes a circumferential side wall 1304 extending from the rounded edges of the vertical wall 1302, and the vertical wall and the circumferential side wall define an open interior 1316 configured to receive a corresponding roller 110 when the roller cover 1300 is mounted in the tumble dryer 100. The roller cover 1300 further comprises a hole 1310 configured to coaxially align with a corresponding roller 110, and the roller cover may be thus be mounted or otherwise connected to the corresponding roller 110 via a connector 402 (e.g., a bolt or the like) as discussed. The roller cover 1300 further includes an integral spacer 1318. In this embodiment, the integral spacer 1318 is conical in shape, with an inner edge thereof (i.e., an edge including the hole 1310) conically recessed from the vertical wall 1302. In this regard, the integral spacer 1318 facilitates unobstructed rotation of the corresponding roller 110 when the roller rotatable supports the rotatable drum 108 as discussed, and additionally the integral spacer forms a pocket to securely receive the connector 402 (as best seen in FIG. 13A).

As with the roller cover 1500, in this embodiment the roller cover 1300 includes a roller cover alignment system configured to align the roller cover when the roller cover is coaxially mounted on a corresponding roller 110. Specifically, the roller cover 1300 is symmetrical about a vertical centerline and thus the roller cover may be conveniently mounted on any roller 110. That is, no matter which side of the cabinet 106 or the rotatable drum 108 the roller cover 1300 is mounted, once mounted to the corresponding roller 110, the flat portion 1312 of the vertical wall 1302 will be disposed proximate to the outer surface of the rotatable drum 108. In order to properly align the roller cover 1300 when mounted, the roller cover includes a roller cover alignment system including a first positioning seat 1320 and a second positioning seat 1322, each configured to receive a pair of pins 1324 provided in the basement 114 of the tumble dryer 100. For example, when mounted on a first side of the rotatable drum 108 as depicted in FIG. 13A, the roller cover 1300 is coaxially mounted with the corresponding roller 110 such that the first positioning seat 1320 receives the pair of pins 1324. In that regard, and as best seen in FIG. 13A, the flat portion 1312 of the vertical wall 1302 will be arranged to generally follow the contour of the outer surface of the rotatable drum 108, such that a majority of the corresponding roller 110 will be shielded from a fire if one ultimately ignites within the basement 114 of the tumble dryer 100. Although not shown, when the roller cover 1300 is mounted on a second side of the rotatable drum 108 (i.e., a side of the rotatable drum opposite from that depicted in FIG. 13A), the roller cover will be mounted such that the second positioning seat 1322 receives the pair of pins 1324, such that the flat portion 1312 of the vertical wall 1302 slants the opposite way than that depicted in FIG. 13A, thus generally following the contour of the outer surface of the rotatable drum 108 on the opposite side of the tumble dryer 100.

When mounted on a corresponding roller 110, any of the above-described roller covers 120, 1100, 1200, 1300, 1500 may serve as a fire protection barrier in order to, e.g., combat or control an internal fire or burning from spreading to and igniting the rollers 110. More particularly, each roller cover 120, 1100, 1200, 1300, 1500 may be constructed of a suitable fire-resistant material, such as metal or fire-resistant plastic. For example, in some embodiments the roller covers 120, 1100, 1200, 1300, 1500 may be constructed of stainless steel or aluminum. In other embodiments, the roller covers 120, 1100, 1200, 1300, 1500 may be constructed of a fire-resistant plastic (e.g., polypropylene charged with various fire-retardant materials, etc.) comprising a suitable thickness to control or combat an internal fire or burning in the tumble dryer 100. In some embodiments, the thickness of the metal or fire-resistant plastic may be, e.g., greater than 0.5 millimeters.

As best seen in FIGS. 4A-4B, 8, 11A, 12A, 13A, and 15, when the roller cover 120, 1100, 1200, 1300, 1500 is mounted to a corresponding roller 110 via the connector 402 (e.g., a bolt in the depicted embodiments), the roller is substantially unexposed to the basement 114 of the tumble dryer. More particularly, the vertical wall 302, 1102, 1202, 1302, 1502 is proximate to and shields a majority of a face of the roller 110 which faces an interior of the tumble dryer 100, with a frame, cabinet 106, etc., to which the roller is mounted being proximate to and thus shielding the opposite face of the roller. Further, the bottom wall 306, 1106, 1206 or circumferential side walls 1304, 1504 shields the bottom of the roller 110, the side walls 304, 308, 1104, 1108, 1204, 1208, 1304, 1504 shield the sides of the roller, and the rotatable drum 108 generally covers (and thus shields) the top portion of the roller (i.e., the portion of the roller that extends vertically beyond the flat portion 312, 1212, 1312, 1512 and/or the slanted portion 314, 1114, 1214, 1215 of the vertical wall 302, 1102, 1202, 1302, 1502). Accordingly, should a fire or burning ultimately start within, e.g., the basement 114 of the tumble dryer 100, the roller cover 120, 1100, 1200, 1300, 1500 will shield the plastic or rubber-like rollers 110, which may otherwise be prone to burning and thus propagating fire further throughout the tumble dryer.

The roller cover 120, 1100, 1200, 1300, 1500 may be constructed using any suitable process for forming sheet metal and/or fire-resistant plastic components. For example, in embodiments where the roller cover 120, 1100, 1200, 1300, 1500 is constructed from fire-resistant plastic, the roller cover may be constructed using an injection molding process or a machinery process. In embodiments where the roller cover 120, 1100, 1200, 1300, 1500 is constructed from metal (e.g., stainless steel, aluminum, or the like), the individual components of the roller cover (e.g., the vertical wall 302, 1102, 1202, 1302, 1502, the bottom wall 306, 1106, 1206, and the side walls 304, 308, 1104, 1108, 1204, 1208, 1304, 1504) may be cut from sheet metal and then welded together along the abutting edges of the components to form the roller cover. In other embodiments, the components of the roller cover 120, 1100, 1200, 1300, 1500 (e.g., the vertical wall 302, 1102, 1202, 1302, 1502 the bottom wall 306, 1106, 1206, and the side walls 304, 308, 1104, 1108, 1204, 1208, 1304, 1504) may be formed from a single, integral piece of sheet metal, which is then press folded into shape. For example, the roller cover 120, 1100, 1200, 1300, 1500 may be cut from a single piece of sheet metal and folded along the edges of the vertical wall 302 1102, 1202, 1302, 1502 where the vertical wall abuts the bottom wall 306, 1106, 1206, and/or the side walls 304, 308, 1104, 1108, 1204, 1208, 1304, 1504. Any other suitable process for manufacturing metal and/or fire-resistant plastic components may be used to construct the roller cover 120, 1100, 1200, 1300, 1500 without departing from the scope of this invention.

In some embodiments, other internal components of the tumble dryer 100 may comprise suitable fire-resistant shielding to control or combat an internal fire or burning in the tumble dryer. For example, and returning to FIG. 1, in embodiments where the tumble dryer 100 comprises the casing 116 including the process air moisture condensing device 202 (e.g., the air-to-air heat exchanger of the process air condenser, the coolant evaporator of the heat pump assembly, etc.), the tumble dryer may comprise one or more water pipes 118 operatively connected to one or more components of the process air moisture condensing device. For example, in some embodiments, water condensed at the process air moisture condensing device 202 is collected in a sump placed in the basement 114 of the tumble dryer 100. This collected water may then be pumped via a condensate pump or the like along a condensate pump pipe (as one suitable example of the water pipe 118) to a condensate collecting tank, which may be periodically accessed and emptied by a user (e.g., after each drying cycle). If the condensate collecting tank becomes full, water from the condensate collecting tank may be directed to the sump in the basement via an overfill pipe (as another suitable example of the water pipe 118). In other embodiments, water condensed at the process air moisture condensing device 202 may be directly routed to a drain or the like via a drain pipe (as still another suitable example of the water pipe 118) in which case the condensate collecting tank is not used and/or may be bypassed.

In any event, the one or more water pipes 118 may be made of any suitable material configured to direct collected water out of the tumble dryer 100. For example, in some embodiments the one or more water pipes 118 may be constructed of a suitable plastic or rubber-like material such as, e.g., polyurethane, PVC, etc., such that the water pipes exhibit a suitable flexibility required to route the water pipes throughout the cabinet 106 of the tumble dryer 100. However, and as with the rollers 110, the water pipes 118, when constructed of a plastic or rubber-like material, may be prone to igniting and thus propagating a fire or burning ultimately started within the tumble dryer 100.

Figure 5:
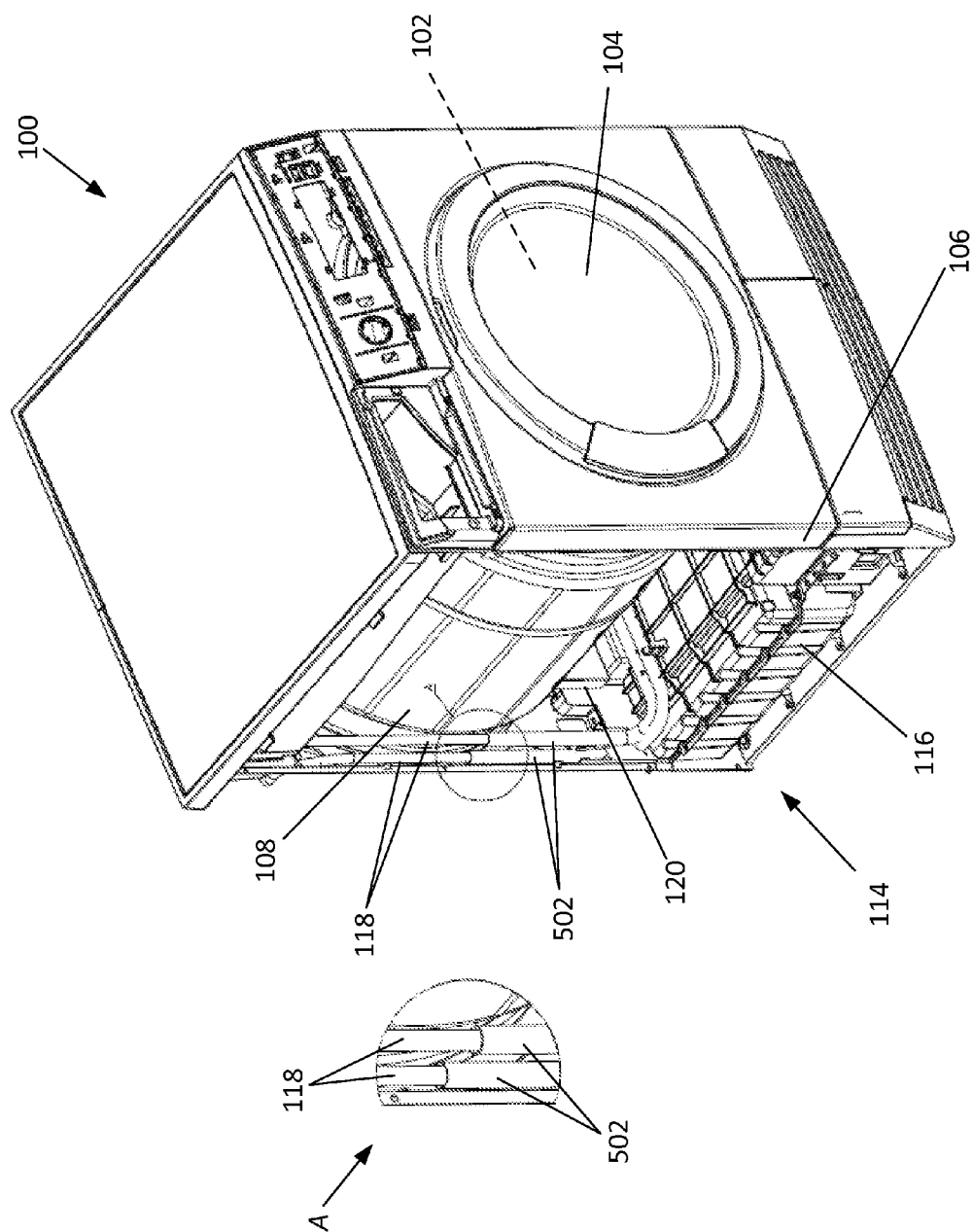
FIG. 5 is a perspective view of the tumble dryer generally as depicted in FIG. 1, but with a portion of the cabinet removed to show, in accordance with an aspect of the invention, pipe coverings as an example of fire-resistant shielding which are provided on water pipes operatively connected to at least one component of a process air moisture condensing device located in the casing.

Accordingly, and as best seen in FIG. 5, in some embodiments the tumble dryer 100 may further comprise one or more pipe coverings 502. The one or more pipe coverings 502 may wrap completely around the outer circumference for at least a portion of the length of a corresponding water pipe 118 such that the portion of the water pipe covered by the pipe covering will ultimately be shielded should a fire or other burning started within the tumble dryer 100. For example, as depicted in FIG. 5, the pipe covering 502 extends around the entire circumference of the outer surface of the water pipes 118 along a portion of the pipes provided in the basement 114 of the tumble dryer 100. Further, and as detailed in the enlarged section "A" shown in FIG. 5, in the depicted embodiment the pipe covering 502 does not extended along the entire length of the water pipes 118 but rather terminates at a portion near where the vertically-extending water pipes are closest to the rotatable drum 108. That is, because a fire or burning may be most likely to ignite in the basement 114 of the tumble dryer 100, material and/or cost may be reduced by only providing the covering along a portion of the water pipes 118 that are proximate to the basement of the tumble dryer. Further, because the water pipes 118 in the depicted embodiment extend vertically to a position where they are very near the rotatable drum 108 (as best seen in enlarged section "A" in FIG. 5), the rotatable drum 108 may serve to shield a portion of the water pipes which extend beyond an uppermost edge of the pipe covering 502. However, in other embodiments, the pipe covering 502 may not wrap completely around the circumference of the outer surface of the water pipes 118, may extend along the entire length of the water pipes, and/or may extend along a larger or smaller portion of the length of the water pipes than the portion covered in FIG. 5 without departing from the scope of this disclosure.

The pipe covering 502 may be constructed of any suitable fire-resistant material. For example, the pipe covering 502 may be fiberglass based. In still other embodiments, the pipe covering 502 (fiberglass based or otherwise) may be combined with a silicon coating to improve the pipe covering's fire-resistant performance. In such an embodiment, the pipe covering 502 (fiberglass based or otherwise) may be flexible enough to, e.g., follow the contour of the water pipes 118.

In still other embodiments, the tumble dryer 100 may include additional shielding in the basement 114 of the tumble dryer in order to contain or combat a fire or burning ultimately started within the tumble dryer. For example, turning to FIGS. 6 and 7, in some embodiments the tumble dryer 100 may comprise casing covers 602, 604, and/or 606. The casing covers 602, 604, 606 may generally be constructed of, e.g., sheet metal (such as, e.g., aluminum, stainless steel, or the like) or fire-resistant plastic and may be configured to substantially cover (and thus shield) the casing 116 and/or other components provided in the basement 114 of the tumble dryer 100. The casing covers 602, 604, and 606 may be constructed of a suitable thickness in order to sufficiently control or combat a fire or burning within the tumble dryer. For example, in some embodiments the casing covers 602, 604, 606 may have a thickness of between 0.2 and 0.6 millimeters.

In such embodiments, a fire or other burning within the tumble dryer 100 may be sufficiently combatted or contained because the casing 116 and/or other internal components may be shielded from the fire or other burning. For example, in some embodiments the casing 116 that contains other components therein (e.g., the process air condenser including the air-to-air heat exchanger, the heat pump assembly including the coolant evaporator, coolant condenser, one or more coolant-to-air heat exchangers, air ducts, coolant loops, etc.) may be generally constructed of plastic such as, e.g., a polypropylene based plastic. This plastic casing 116 may thus be prone to igniting if a fire or burning is started within the tumble dryer 100. However, in embodiments including the casing covers 602, 604, 606, the casing 116 and its internal components (e.g., process air condenser, heat pump assembly, etc.) may be sufficiently shielded such that, if a fire were to begin in the basement 114 of the tumble dryer 100, it would not spread to the plastic casing. Further, because in some embodiments one or more of the casing covers 602, 604, 606 (in the depicted embodiment, casing cover 606) is provided below the motor 112, if the motor is ultimately subjected to a fire or burning within the tumble dryer 100, any molten parts of the motor which may have otherwise fallen onto the combustible material (e.g., the plastic of the casing 116) may be caught by the one or more casing covers, further preventing the spread of the internal fire or burning.

Figure 6:
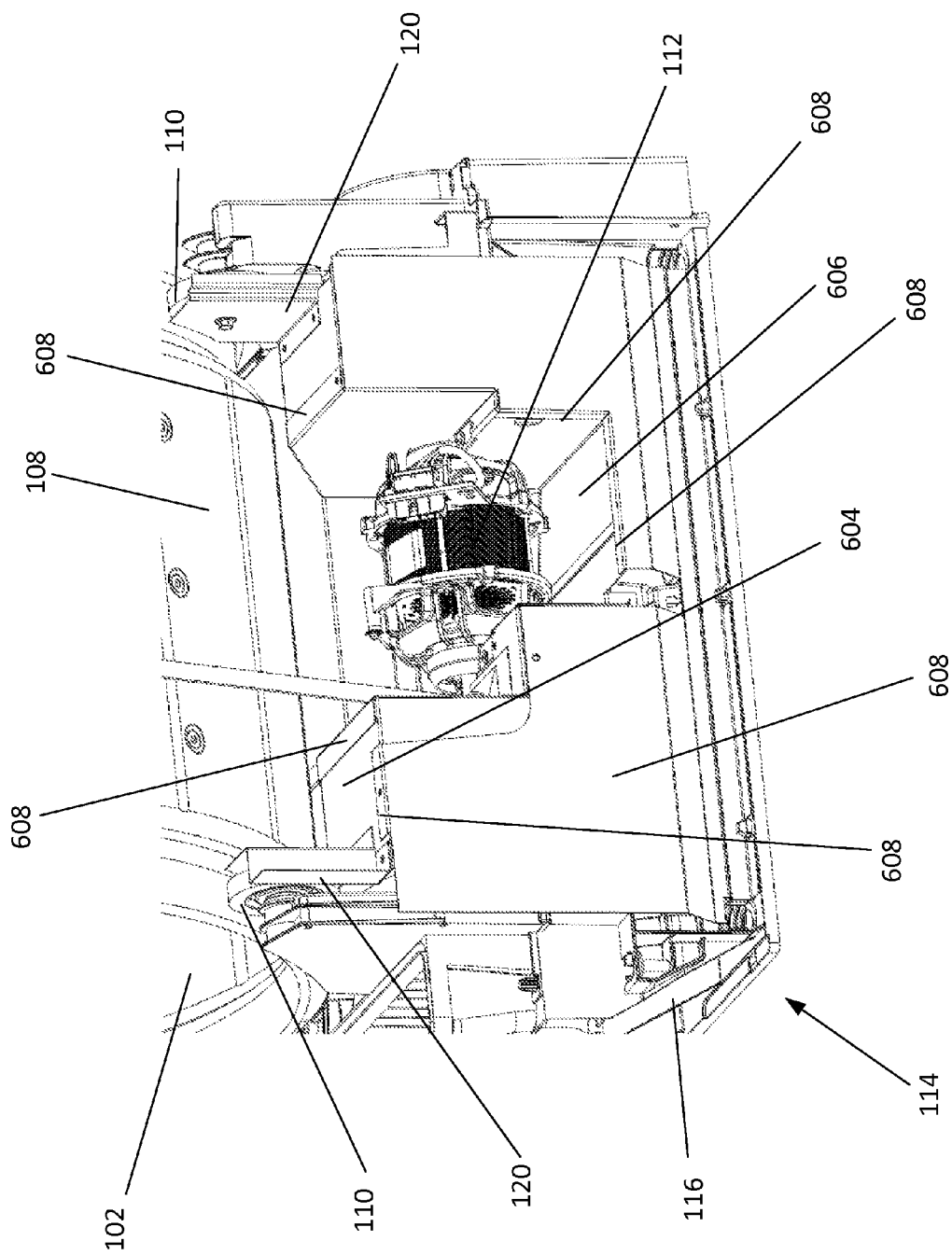
FIG. 6 is a perspective view of a portion of the internal components of the tumble dryer generally as depicted in FIG. 1, but including, in accordance with an aspect of the invention, casing covers provided over the generally plastic casing.
Figure 7:
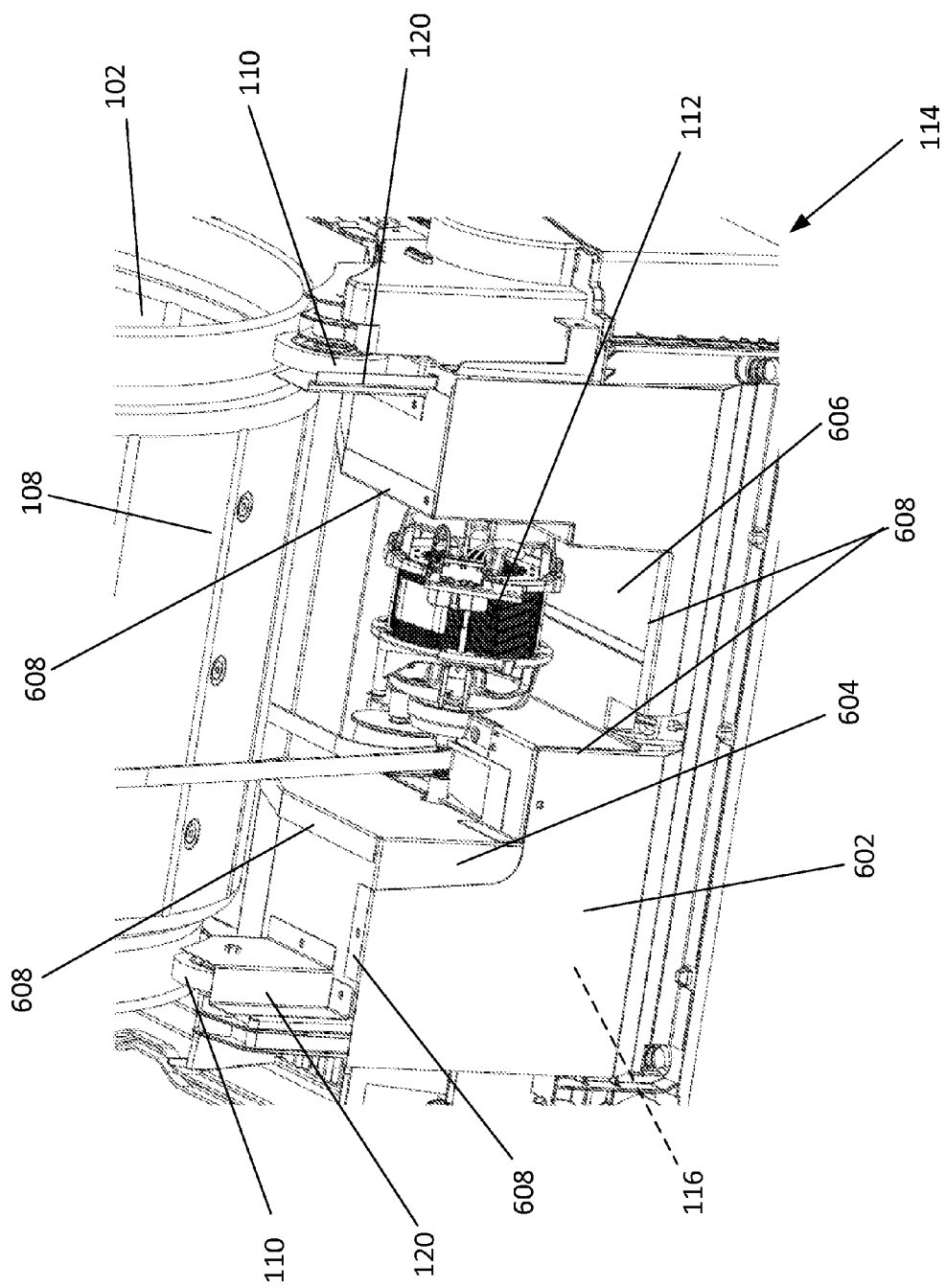
FIG. 7 is another perspective view of a portion of the internal components of the tumble dryer as shown in FIG. 6.

In some embodiments, the casing covers 602, 604, 606 may comprise one or more overlapping portions 608 used to connect the one or more casing cover components to one another. For example, and as best seen in FIGS. 6 and 7, in some embodiments the casing cover 602 may comprise the overlapping portions 608 which overlap and connect to the casing cover 604 and/or the casing cover 606. In other embodiments, the casing cover 604 and/or 606 may comprise the overlapping portions 608. In any event, the overlapping portions 608 may connect one casing cover component (e.g., one of the casing covers 602, 604, 606) to another casing cover component and may be fixed using any suitable means including, e.g., using one or more suitable connectors (e.g., bolts, screws, rivets, etc.), using a suitable adhesive, and/or welding the components together.

Connecting the casing covers 602, 604, 606 to one another via one or more overlapping portions 608 provides a high stiffness and/or robustness should the casing cover be exposed to a fire or other burning within the tumble dryer 100. For example, in embodiments where the casing 116 is constructed of plastic or the like, the casing may melt or otherwise deform when a fire or other burning is within the tumble dryer 100 due to the heat generated by the fire. Thus, when the casing covers 602, 604, 606 are constructed from relatively thin aluminum or the like (e.g., 0.2 to 0.6 millimeters) without the overlapping portions 608, the casing cover may deform and/or collapse when the underlying casing 116 melts or otherwise deforms due to the heat generated within the tumble dryer 100. However, in embodiments comprising the overlapping portions 608, the casing covers 602, 604, 606 may exhibit superior stiffness properties as compared to embodiments not including the overlapping portions, such that the casing covers maintains their structure (and thus their fire protection properties) regardless of whether or not the underlying casing 116 melts or collapses due to the heat within the tumble dryer 100.

Figure 8:
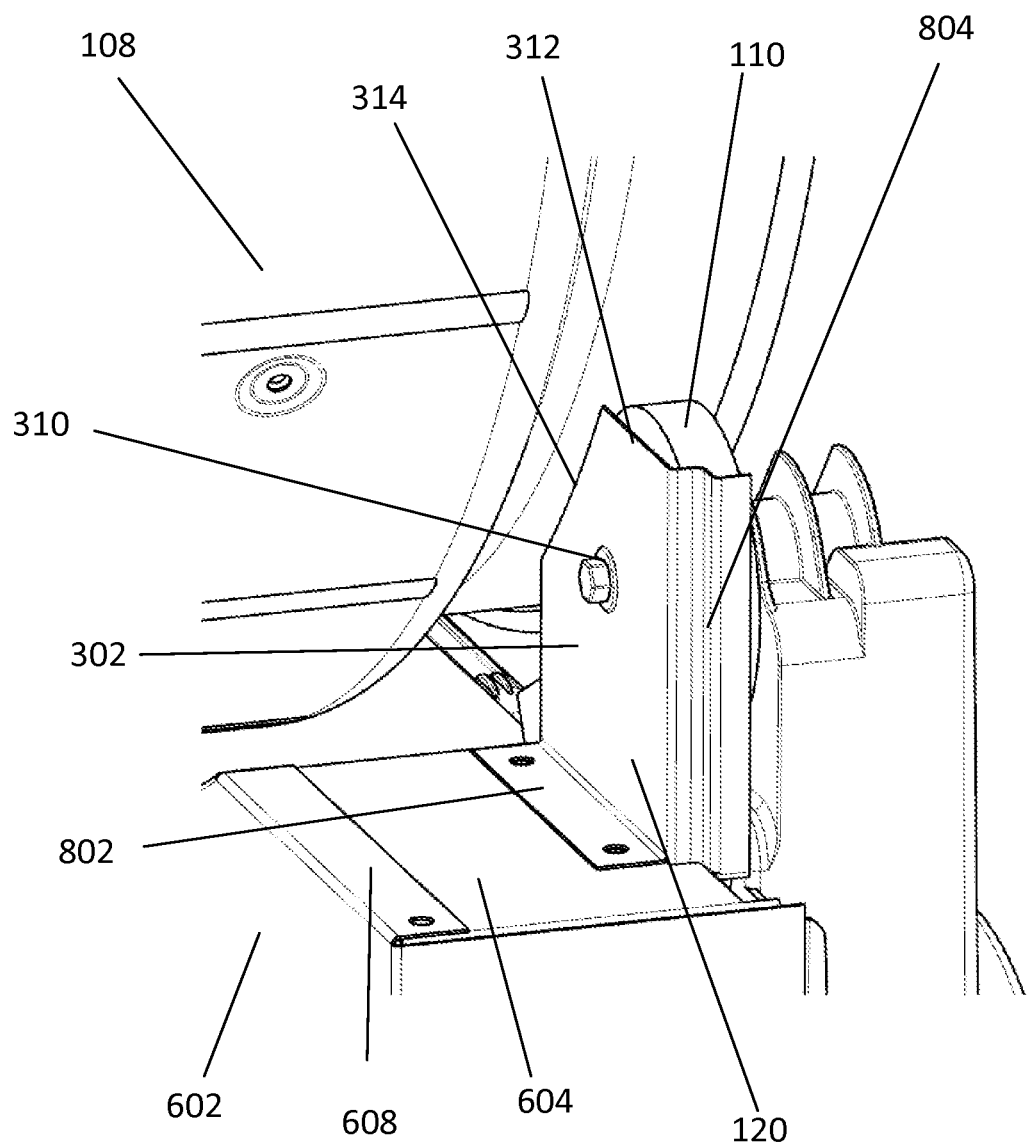
FIG. 8 is a close-up perspective view of one of the roller covers as shown in FIGS. 6 and 7 showing a plurality of connection flaps provided on the roller cover.

In some embodiments, the roller cover 120 (and/or the roller covers 1100, 1200, 1300, 1500, although for simplicity the following embodiment will only be discussed with reference to roller cover 120) may be connected to or otherwise provided integrally with the casing covers 602, 604, and/or 606. For example, and as best depicted in FIG. 8, in some embodiments the roller cover 120 may include (instead of or in addition to hole 310) one or more connection flaps 802. The one or more connection flap 802 may abut the vertical wall 302, the side walls 304, 308, and/or the bottom wall 306. For example, in the depicted embodiment the connection flap 802 abuts a lowermost horizontal edge of the vertical wall 302. In other embodiments, and as seen in, e.g., the leftmost roller cover 120 depicted in FIG. 7, a connection flap may abut, e.g., the side wall of the roller cover along an outer vertical edge and a lowermost horizontal edge of the side wall, respectively. The one or more connection flaps 802 may be connected to, e.g., the frame of the tumble dryer 100, the cabinet 106 of the tumble dryer, and/or the casing covers 602, 604, 606 using any suitable method (e.g., rivets, bolts, screws, adhesives, welding, etc.). Further, and as depicted in FIG. 8, the roller cover 120 may be coaxially mounted to the corresponding roller via hole 310 (as discussed) in addition to being fixed to, e.g., the frame of the tumble dryer 100, the cabinet 106 of the tumble dryer, and/or the casing covers 602, 604, 606. However, in other embodiments (not shown) the roller cover 120 including the one or more connection flaps 802 may omit the hole 310 and, accordingly, be fixed in place using only the one or more connection flaps.

Figure 10:
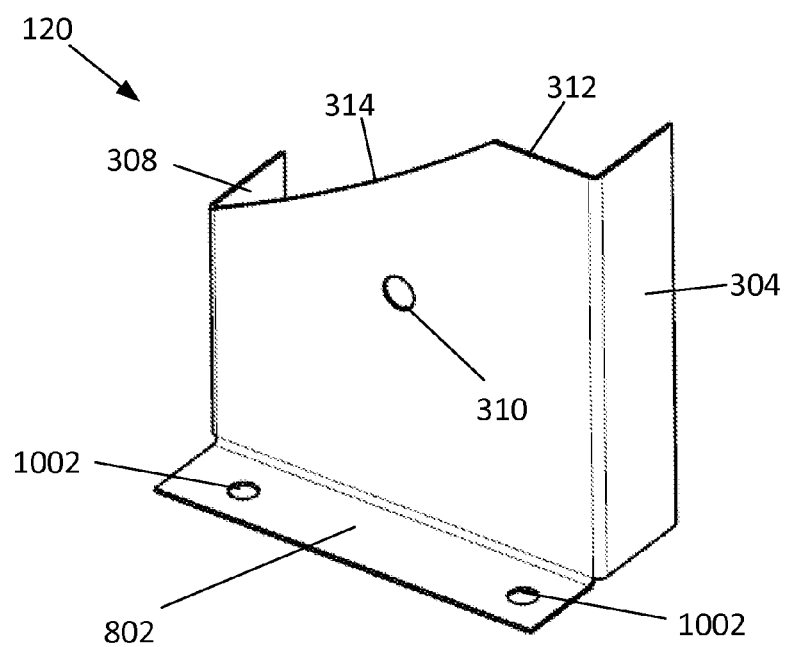
FIG. 10 is a perspective view of another embodiment of a roller cover when not mounted to the corresponding roller.

FIG. 8 depicts an embodiment of the roller cover 120 including a stair-stepped side wall 804 rather than, e.g., the side wall 304 discussed in connection with FIG. 3. However, other embodiments of the roller cover 120 including the one or more connection flaps 802 may alternatively include the side wall 304 rather than the stair-stepped side wall 804 (as depicted in FIG. 10). Further, and as best seen in FIG. 10, embodiments of the roller cover 120 including the one or more connection flaps 802 may further comprise one or more mounting holes 1002. The one or more mounting holes 1002 may be provided in the one or more connection flaps 802 and facilitate mounting the roller cover 120 to, e.g., the frame of the tumble dryer 100, the cabinet 106 of the tumble dryer, and/or the casing covers 602, 604, 606, by receiving a corresponding screw, bolt, rivet, or other fastener.

As with the roller cover 120 discussed in connection with FIGS. 1-4B, the roller cover 120 comprising the one or more connection flaps 802 may sufficiently surround a corresponding roller 110 in order to shield the plastic or rubber-like material of the roller from a fire or other burning within the tumble dryer 100. Further, in embodiments comprising the one or more connection flaps 802, the roller cover 120 and/or the casing cover 602, 604, 606 that the roller cover is connected to via the one or more connection flaps may exhibit improved stiffness and/or robustness if internal components of the tumble dryer (e.g., the casing 116) should melt or otherwise deform due to the heat caused by a fire or burning within the tumble dryer 100, as discussed above in connection with FIGS. 6-7.

Figure 9:
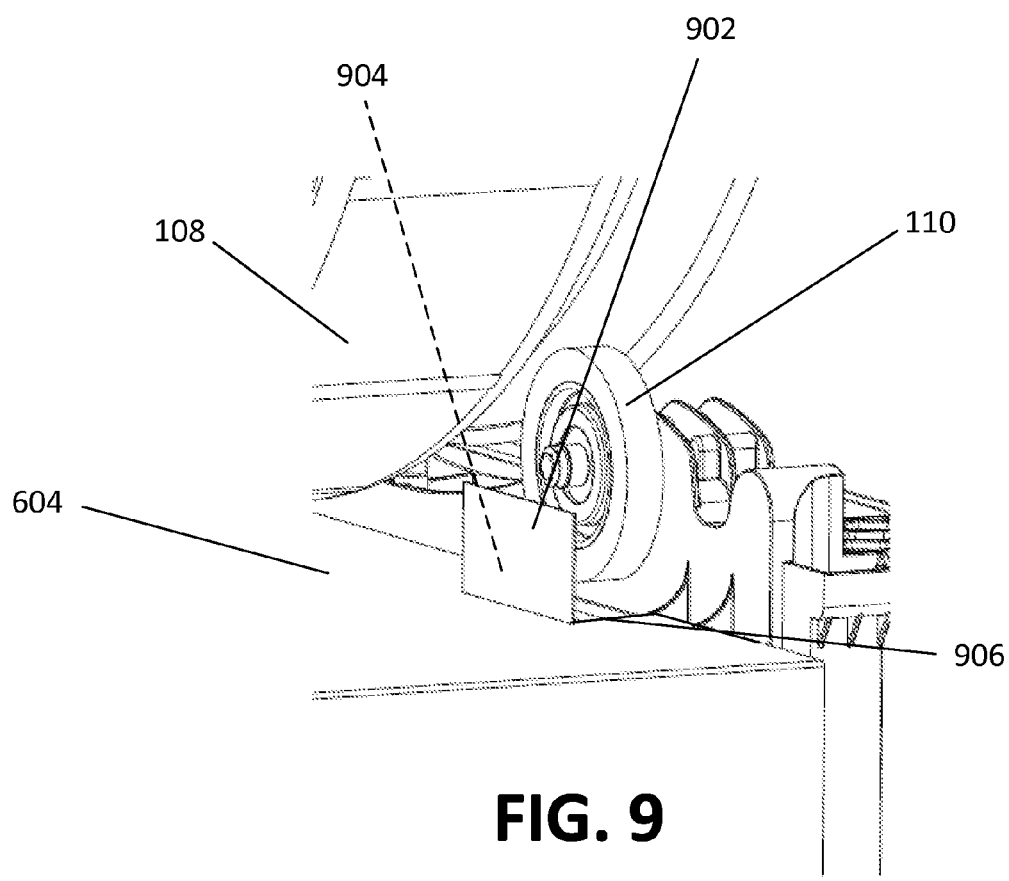
FIG. 9 is a close-up perspective view of a portion of the internal components as generally shown in FIGS. 6-8, but with a roller cover provided integral to the casing cover according to an aspect of the invention.

In still other embodiments, and as depicted in FIG. 9, the tumble dryer 100 may comprise an integral roller cover 902 rather than or in addition to roller cover 120, 1100, 1200, 1300, 1500. The integral roller cover 902 (much like the embodiments of the roller cover 120, 1100, 1200, 1300, 1500 discussed in connection with FIGS. 1-4B, 6-8, and 10-16) may shield the plastic or rubber-like roller 110 from a fire or other burning within the tumble dryer 100. However, in this embodiment, rather than being coaxially connected to the roller 110 (as depicted in FIGS. 1, 2, 4A, 4B, 6-8, 11-13, 15) and/or being connected to a frame, cabinet 106, or the casing covers 602, 604, 606 of the tumble dryer 100 (as depicted in FIGS. 6-8), the integral roller cover 902 is provided as an integral component of the casing cover 604. More particularly, in the embodiment depicted, the integral roller cover 902 comprises a folded-up flap in the casing cover 604 (formed by two cuts 904, 906 provided in the casing cover) which, when folded up, is proximate to a face of the roller 110. Accordingly, in such embodiments a fire or burning within the tumble dryer 100 can be controlled or combatted using, e.g., one integral piece of sheet metal or the like.

The present invention has been described in terms of preferred and exemplary embodiments thereof. Numerous other embodiments, modifications, and variations within the scope and spirit of the appended claims will occur to persons of ordinary skill in the art from the review of this disclosure.

We claim:

1. A laundry dryer comprising:
a cabinet;
a rotatable drum provided within the cabinet;
a plurality of rollers rotatably supporting the rotatable drum; and
a fire-resistant roller cover, wherein the roller cover comprises an open interior configured to receive a corresponding one of the plurality of rollers and covers a majority of a face of the corresponding roller such that the corresponding roller is shielded from fire within the cabinet of the laundry dryer.

2. The laundry dryer of claim 1, wherein the roller cover comprises:
a vertical wall;
a first and second side wall; and
a bottom wall, wherein the vertical wall covers the majority of the face of the corresponding roller, and wherein the face of the corresponding roller covered by the vertical wall faces an interior of the laundry dryer.

3. The laundry dryer of claim 2, wherein the vertical wall of the roller cover comprises a slanted portion of an uppermost edge thereof, wherein the slanted portion is disposed proximate to an outer circumferential surface of the rotatable drum.

4. The laundry dryer of claim 2, wherein the vertical wall comprise a hole, and wherein the roller cover is mounted to the corresponding one of the plurality of rollers via a connector extending through the hole and received in an axle of the corresponding one of the plurality of rollers.

5. The laundry dryer of claim 1, further comprising:
a process air moisture condensing device provided in a casing; and
a fire-resistant casing cover, wherein the casing cover is configured to shield the casing from fire within the cabinet of the laundry dryer.

6. The laundry dryer of claim 5, further comprising a motor, wherein at least a portion of the casing cover is disposed below the motor.

7. The laundry dryer of claim 5, wherein the roller cover is integrally formed in the casing cover.

8. The laundry dryer of claim 5, wherein the roller cover comprises:
a vertical wall;
a first and second side wall; and
at least one connection flap abutting at least one of the vertical wall, the first side wall, and the second side wall.

9. The laundry dryer of claim 8, wherein the at least one connection flap is connected to the casing cover.

10. The laundry dryer of claim 1, wherein the roller cover is constructed of stainless steel.

11. The laundry dryer of claim 1, wherein the roller cover is constructed of a fire-resistant plastic.

12. The laundry dryer of claim 1, wherein the roller cover includes a roller cover alignment system configured to align the roller cover when the roller cover is coaxially mounted on a corresponding roller.

13. The laundry dryer of claim 12, wherein the roller cover alignment system includes a first positioning hole or seat and a second positioning hole or seat, each configured to receive at least one pin provided in an interior of the laundry dryer.

14. A laundry dryer comprising:
a cabinet;
a process air moisture condensing device provided in a casing in a basement of the cabinet;
a water pipe operatively connected to at least one component of the process air moisture condensing device; and
a fire-resistant pipe covering, wherein the pipe covering is configured to shield at least a portion of the water pipe from a fire within the cabinet of the laundry dryer.

15. The laundry dryer of claim 14, wherein the pipe covering wraps completely around an outer circumferential surface of the water pipe for at least a portion of a length of the water pipe.

16. The laundry dryer of claim 15, further comprising a rotatable drum, wherein the water pipe extends substantially vertically at a portion of the water pipe disposed next to the rotatable drum.

17. The laundry dryer of claim 16, wherein the pipe covering wraps completely around the outer circumferential surface of the water pipe for a portion of the length of the water pipe extending from the heat pump assembly to a position of the water pipe disposed closest to the rotatable drum.

18. The laundry dryer of claim 14, wherein the pipe covering comprises fiberglass.

19. The laundry dryer of claim 18, wherein the pipe covering further comprises a silicon coating.

20. The laundry dryer of claim 19, where a fire-resistance property of the pipe covering comprising the silicon coating is greater than a fire-resistance property of a pipe covering only comprising fiberglass.

21. A laundry dryer comprising:
a cabinet;
a process air moisture condensing device provided in a casing in a basement of the cabinet; and
a fire-protection shield, wherein the fire-protection shield is configured to shield at least one internal component other than the casing from a fire within the cabinet of the laundry dryer.

22. The laundry dryer of claim 21, further comprising a fire-resistant casing cover configured to shield the casing from a fire within the cabinet of the laundry dryer.

* * * * *